Figure 3:
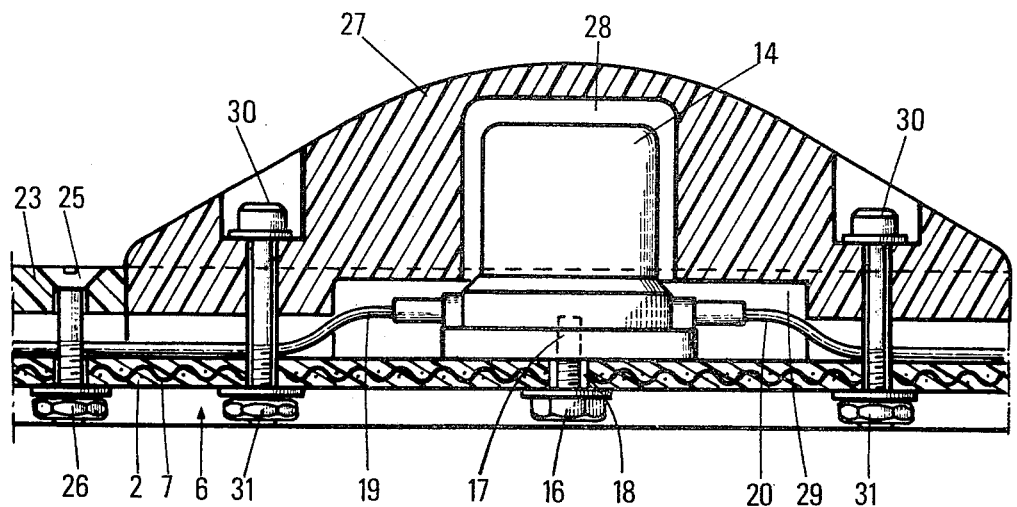

United States Patent [19]
Laurent

[11] 3,987,405
[45] Oct. 19, 1976

[54] RECEIVER OF CONTINUOUS STRUCTURE FOR SEISMIC PROSPECTING

[75] Inventor: Jean Laurent, Morainvilliers, France

[73] Assignees: Institut Francais du Petrole, des Carburants et Lubrifiants et Entreprise de Recherches et d'Activities Petrolieres Elf; Compagnie Generale de Geophysique, both of France

[22] Filed: Dec. 2, 1974

[21] Appl. No.: 528,832

[30] Foreign Application Priority Data
Dec. 11, 1973 France .............................. 73.44458
July 8, 1974 France .............................. 74.23906

[52] U.S. Cl. .............................. 340/17 R; 340/7 R; 174/70 R; 174/97
[51] Int. Cl.² .......................................... G01V 1/20
[58] Field of Search ............ 340/7 R, 17; 174/70 R, 174/97

[56] References Cited
UNITED STATES PATENTS

| | | | |
|---|---|---|---|
| 2,649,579 | 8/1953 | Alexander | 340/7 R |
| 2,807,793 | 9/1957 | Bayhi | 340/17 |
| 3,689,875 | 9/1972 | Kostelnicek | 340/7 R |
| 3,825,886 | 7/1974 | Thigpen | 340/7 R |

*Primary Examiner*—H.A. Birmiel
*Attorney, Agent, or Firm*—Craig & Antonelli

[57] ABSTRACT

Receiver of continuous structure adapted to be laid on the ground surface or underground, for seismic prospecting on land, comprising at least one support member for geophones, made of a flexible material having an elongated central portion and two lateral portions defining therewith at least one recess, said geophones being fastened to the central portion of the support member and coupled to the earth therethrough and said lateral portions being provided with longitudinal channels housing conductor cables.

20 Claims, 8 Drawing Figures

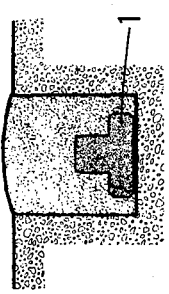
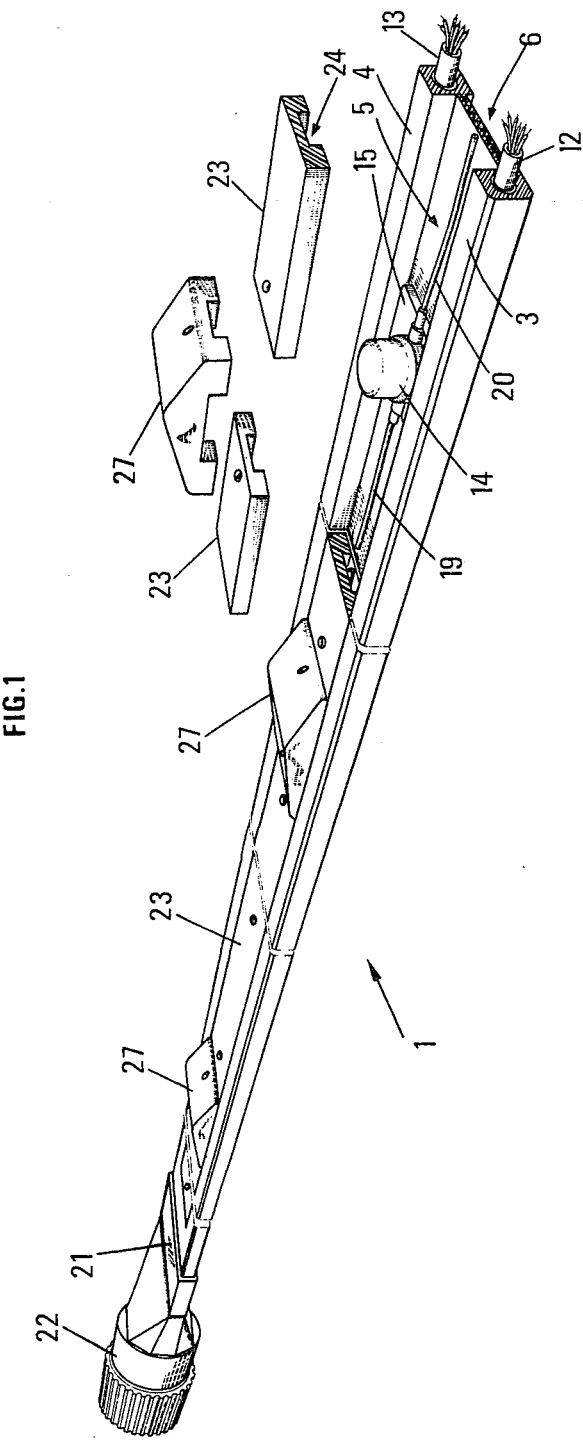

RECEIVER OF CONTINUOUS STRUCTURE FOR SEISMIC PROSPECTING

This invention concerns a receiver of continuous structure which can be used in particular for seismic prospecting on land and a method using said receiver.

The usual seismic prospecting methods comprise transmitting acoustic waves through the earth, receiving and recording at the ground surface or in the vicinity thereto, the waves which are reflected or diffracted on the different layers of the surveyed underground.

The receiver usually comprises a multi-conductor cable commonly called streamer cable to which are connected secondary conductor cables or branched circuits each interconnecting a plurality of geophones.

Each geophone is generally provided with a pin in view of improving its coupling with the ground. The geophones of each branched circuit are positioned manually according to a predetermined arrangement. When laying each geophone, it is important, irrespective of the ground consistency, to drive the pin thereof into the ground in a fairly vertical direction. The positioning of each receiver, prior to any recording operation, is time consuming and laborious and may sometimes require many workers.

The receiver of this invention avoids the above-mentioned inconveniences. It is advantageous since, due to its arrangement, it is possible to simplify and to speed up the positioning of the assembly of geophones, and to make use of a mechanical system for laying and removing them.

The receiver of the invention comprises at least one elongated member made of a flexible material and sensing means. It is remarkable in that the support member comprises an elongated portion, solid with two lateral portions which are thicker than the central portion and define therewith at least one recess.

The sensing means are solid with the central portion of the support member and coupled with the ground through the latter. They are, for example, fastened at selected places of the central recess of the support member.

Multi-conductor cables are passed through channels provided in the two transverse portions of the support member or may be placed inside the central recess. In order to improve the tensile strength of each support member, traction cables may be provided in channels arranged within the transverse portions thereof.

Several support members may be interconnected in order to form a seismic streamer. For this purpose the support members are provided at each end thereof with connection means.

This structure is advantageous in that all the elements necessary for the seismic recording on the land are grouped together on one support member and are solid therewith. Since the support member is made of a flexible material, it can be wound on a storage reel. Accordingly, its positioning on the selected profile is greatly facilitated.

The invention also concerns a method of using the above-mentioned device, comprising digging a trench of a length adapted to that of the support element, positioning it on the bottom of the trench and back filling the latter.

By this method of use, it is possible to improve the couplings of the sensing means with the ground.

Figure 2:
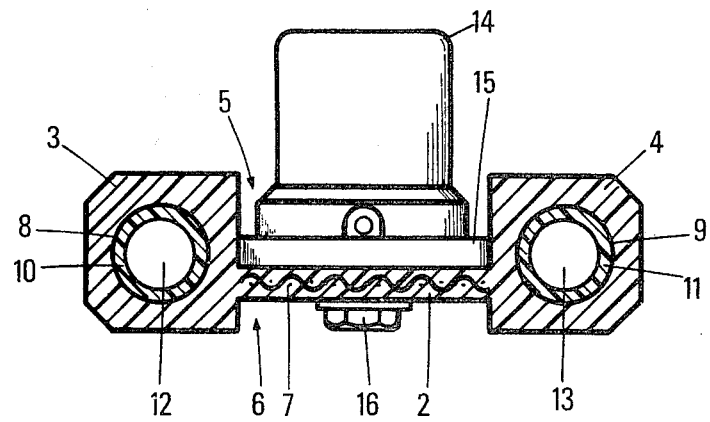
Figure 4:
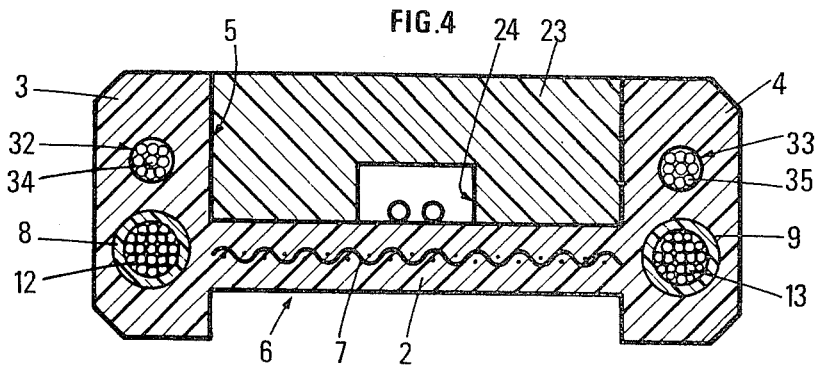
Figure 5:
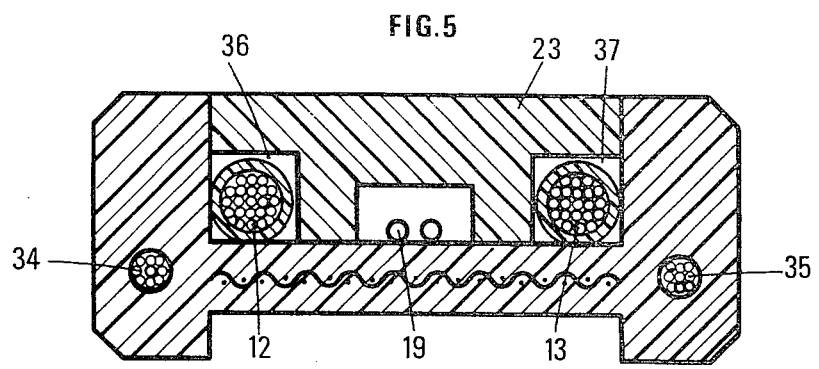
Figure 6:
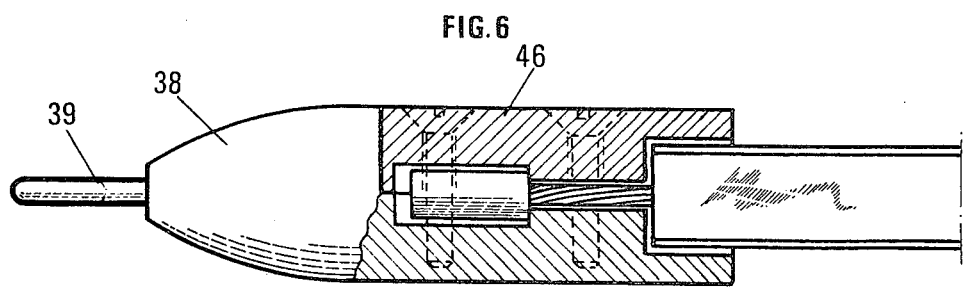
Figure 7:
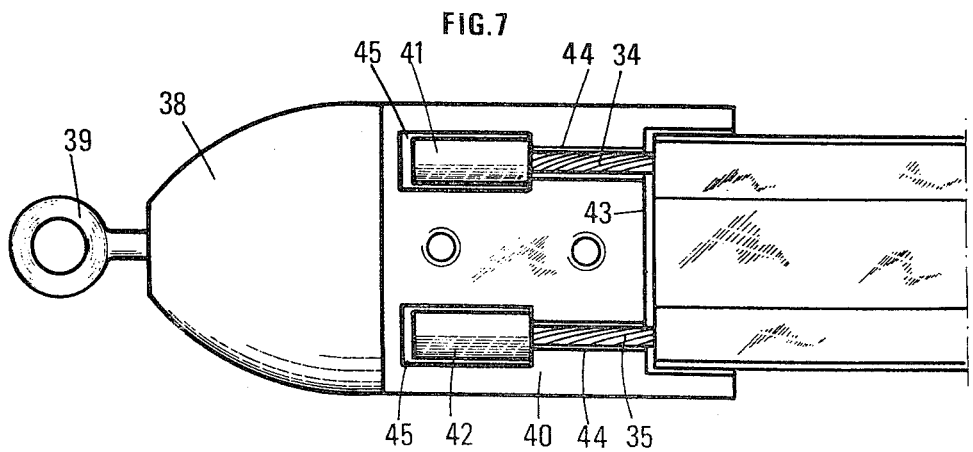

Other characteristics and advantages will be made apparent from the following description of non-limitative embodiments of the device given with reference to the accompanying drawings in which:

FIG. 1 shows a perspective view of the whole device,

FIG. 2 is a cross-sectional view of the support member and of geophones solid therewith, FIG. 3 is a longitudinal cross-sectional view of a portion of a support member solid with a protecting member provided above a geophone, FIG. 4 shows a cross-sectional view of a second embodiment of the support member, FIG. 5 is a cross-sectional view of a third embodiment of the support member, FIG. 6 is a cross-sectional view of the end portion through which the seismic streamer can be hooked to traction means, FIG. 7 is a view of one of the constitutive members of the end portion, and FIG. 8 shows the device inside a trench dug in the ground.

The device of the invention comprises (see FIGS. 1 and 2) a support member of great length 1 made of flexible material, e.g. rubber. The support element 1 comprises an elongated central portion or base 2, solid, along its lateral surfaces, with two elongated portions or wings 3 and 4 of rectangular section which are thicker and substantially of the same length as the base 2. Both wings define with the base, on both sides thereof, two recesses or grooves 5 and 6 of different depths. One or more fabric strips 7 embedded in the thickness of the base or of the wings reinforce their tensile strength. The two lateral portions 3 and 4 each comprise a longitudinal channel 8 and 9 respectively. The support member assembly is made by moulding. Both channels 8 and 9 may be delimited by flexible pipes 10 and 11 embedded in the flexible material during its moulding operation of the support member. Two multi-conductor cables 12 and 13 are passed through channels 8 and 9. At selected places of the support members, geophones 14, each provided with a base plate 15, are fastened to the base 2 in the deeper groove 5. This fastening is achieved for example by means of a nut 16 (FIG. 3) screwed on a threaded rod 17 passing through the base in a hole 18 provided at each selected place, having one end thereof embedded in the base plate 15 of geophone 14. Each geophone is connected in a tight manner with two sheathed electric conductors 19, 20 (FIG. 1) which interconnect geophones fastened on each support member 1.

This support member is solid, at each end thereof, with a coupling member 21 made, for example, of moulded plastic material and provided with channels for the passage of multi-conductor cables 12 and 13 and sheathed conductors such as 19 and 20 therethrough towards the terminals of a cylindrical connector 22 solid with said coupling member. In the portions of the groove 5 between two geophones are fitted plates 23 of flexible material, each provided with a longitudinal recess 24. Screws 25 (FIG. 3) are provided in the holes arranged in the base 2 and in each plate 23 and cooperate with nuts 26 for fastening the latter. The cover formed by the plates 23 avoids any deposit of mud or other sediments in groove 5.

The geophone may be protected by a protective member 27 (FIG. 3), also made of plastic material. The member 27 comprises a recess 28 adapted for housing geophone 14. The width of the protective member is substantially that of groove 5. A longitudinal recess 29 is also provided in the protective member 27 for the passage of sheathed conductors 19, 20 connected to each geophone. Screws 30 are placed in holes arranged in the base 2 and in the protective member 27 and cooperate with nuts 31 for fastening the same to the bottom of groove 5.

A certain number of support members may be interconnected through connectors 22 provided at their ends, in order to form a sensing assembly or seismic streamer of great length.

The support-member illustrated in FIGS. 4 and 5 also comprises a central portion or base 2 in the thickness of which are embedded one or more fabric strips 7 for reinforcing its tensile strength. The base 2 is solid, along its lateral surfaces, with two elongated portions or wings 3 and 4 of rectangular section whose thickness is greater than that of the base.

In the embodiment of FIG. 4, the wings 3 and 4 are each longitudinally traversed with respective channels 8, 32 and 9, 33.

In channels 8 and 9, are placed multi-conductor cables electrically interconnecting the support-members and transmitting the signals from the seismic streamer to the using apparatus. In the channels 32 and 33, are placed two traction cables 34 and 35 having their ends connected to corresponding cables of the preceding and following support-members of the seismic streamer.

The traction cables and multi- conductor cables may be positioned directly during the moulding of each support-member.

Inside one of the recesses 5, defined by the base and the wings, are placed plates 23 made of a flexible material and also provided themselves with recesses for the passage of conductor cables 19, interconnecting the geophones of each support-member.

In the embodiment of FIG. 5, only the traction cables 34, 35 are placed in the longitudinal channels provided in the wings.

The multi-conductor cables 12, 13 are placed in the upper recess 5, of the support-member. The protective plates 23 each comprise two longitudinal recesses 36 and 37 for the passage of the multiconductor cables.

The end portion shown in FIGS. 6 and 7 comprises a plate 38 solid with a hook 39 and provided with a plane surface 40.

The traction cables 34, 35, issuing from the end of the support-member connected to the end portion of the streamer are provided with sleeves 41, 42. Recesses 43, 44, 45, having respective sections adapted to those of the support member, of the traction cables 34, 35 and of the sleeves 41, 42, are provided in the plate 38.

When the sleeves 41, 42, are placed in the recesses 45, a plate 46, comprising recesses which are complementary to to those arranged in plate 40, is placed above the latter so that the corresponding recesses register and define housings for the sleeves, the traction cables and the end of the support-member. Both plates 38 and 46 are then fastened to each other.

The streamer formed by several interconnected elements may be laid on the ground surface. However, in order to improve the coupling of the geophones with the earth, it is preferable to lay it underground. A trench 32 will be dug into the ground (FIG. 8) and the streamer will be laid therein, the groove 6 (FIG. 1) facing the trench bottom. The trench is then back filled.

The laying underground and the removing of the streamer may be carried out automatically. In view of the flexibility of the material used for constituting the support members, the seismic streamer formed by several interconnected members may be wound up on a storage reel.

A banking engine of a known type, carrying a storage reel, digs the trench in a continuous manner and unreels the seismic streamer as it progresses and thereafter, backfills the trench with earth over the streamer. An engine of the same type may, after use, remove the seismic streamer and wind it up again on the storage reel. The mechanization of the laying and removing operations results in a considerable saving of time and of labor.

In order to improve the quality of the recordings, a balance of the seismic "traces" may be achieved by:

varying the distance between the geophones 14, i.e. their respective positions on each support-member 1, making various combinations of the electric signals produced by the geophones of each support-member of certain geophones of two adjacent support-members.

The geophone may be connected either in series or in parallel or still, in series and parallel. The width of the longitudinal recesses 24 (FIG. 1) arranged in the protective plates 23 and the protective members 27 in such a case is adapted for housing the number of interconnection cables which are required for making the convenient connections.

In the above-described embodiment, the acoustic waves are received by geophones placed at predetermined locations. It would not be outside of the scope of the invention to replace the geophones by a continuous sensor of great length comprising a strip of flexible material having piezo-electric properties and provided on each of its faces with an electrode consisting of a deposit of metal layer or still of a thin metal strip. This type of transducer is described in the French Pat. No. 2,145,099. The sensor of continuous structure is then placed in the upper recess 5 of the support-member 1 and made solid therewith.

I claim:

1. A receiver of continuous structure for seismic prospecting on land comprising at least one elongated support-member made of a flexible material and sensing means, in which the support-member comprises an elongated central portion solid with two lateral portions having a greater thickness than that of the central portion and defining therewith at least one recess, and in which said sensing means are secured with the central portion of the support-member and coupled to the earth through said support-member.

2. A receiver according to claim 1, in which the sensing means are fastened at selected locations of the central recess of the support-member.

3. A receiver according to claim 2, in which the two lateral portions are each traversed by a longitudinal channel, multiconductor cables are passed through said channels and conductor means are provided in the recess for interconnecting said sensing means.

4. A receiver according to claim 2, in which the support-member is moulded in a single piece and the central portion is solid with reinforcement means.

5. A receiver according to claim 4, in which the reinforcement means comprise a strip of material integral with the support-member, said strip of material reinforcing the tensile strength of the central portion.

6. A receiver according to claim 3, in which the support-member is made solid at its ends with electric connectors through coupling members provided with channels for the passage of said multi-conductor cables and of said conductor means.

7. Receiver according to claim 2, in which the surface of the central portion facing that on which are secured the pressure transducing means defines with the two lateral portions a second recess less deep than the first one.

8. A receiver according to claim 2, comprising plates made of a flexible material for covering said recess and means for fastening the plates to the central portion of the support-member.

9. A receiver according to claim 8, further comprising protective means and means for fastening said protective means to the support-member at the locations of said sensing means.

10. A device according to any of claim 1, in which the sensing means comprises a continuous strip made of piezo-electric material, said strip being provided with an electrode on each of its faces and being solid with said support-member.

11. Receiver according to claim 2, in which the two lateral portions each comprises at least one longitudinal channel in which is housed a traction cable.

12. A receiver according to claim 11, in which each transversal portion comprises a second longitudinal channel in which is housed a multi-conductor cable.

13. A receiver according to claim 11 in which the multi-conductor cables are placed longitudinally in said recess.

14. A receiver according to claim 13, comprising plates made of a flexible material for covering said recess, said plates comprising longitudinal cavities for the passage of said multi-conductor cables and of conductors for interconnecting the sensing means secured with each support-member.

15. A receiver according to any of claim 11, comprising an end portion solid with a hook and provided with housings for sleeves secured at one of the ends of the traction cables associated with a support-member.

16. A receiver according to claim 15, in which the end portion is achieved by fastening two complementary members provided with recesses defining said housings.

17. A method of positioning the receiver according to claim 1, comprising digging a trench of a length which is substantially that of the support-member, laying said support-member on the bottom of said trench and back-filling the same over said support-member.

18. A method according to claim 17, comprising winding up the support-member on a storage reel and using mechanical means carrying said reel for undergrounding said support-member as it is unreeled from said reel.

19. A receiver according to claim 12, comprising an end portion solid with a hook and provided with housings for sleeves secured at the ends of traction cables associated with said support member.

20. A receiver according to claim 19, in which the end portion is achieved by fastening two complementary members provided with recesses defining said housings.

* * * * *

UNITED STATES PATENT OFFICE
CERTIFICATE OF CORRECTION

Patent No. 3,987,405    Dated October 19, 1976

Inventor(s) Jean Laurent

It is certified that error appears in the above-identified patent and that said Letters Patent are hereby corrected as shown below:

Title Page as it now reads:

"[73] Assignees: Institut Francais du Petrole, des Carburants et Lubrifiants et Entreprise de Recherches et d'Activities Petrolieres Elf; Compagnie Generale de Geophysique, both of France"

Title Page as it should read:

--[73] Assignees: Institut Francais du Petrole and Compagnie Generale de Geophysique (C. G. G.), both of France--

Signed and Sealed this

Twenty-second Day of February 1977

[SEAL]

Attest:

RUTH C. MASON
Attesting Officer

C. MARSHALL DANN
Commissioner of Patents and Trademarks